United States Patent [19]
Kawai et al.

[11] Patent Number: 5,315,415
[45] Date of Patent: May 24, 1994

[54] COLOR IMAGE PROCESSING APPARATUS

[75] Inventors: Takashi Kawai; Akihiro Usami, both of Yokohama; Ken-ichi Ohta, Kawasaki; Yoshiko Horie, Tokyo; Seita Shono, Warabi; Eiji Ohta, Fujisawa, all of Japan

[73] Assignee: Canon Kabushiki Kaisha, Tokyo, Japan

[21] Appl. No.: 793,011

[22] Filed: Nov. 15, 1991

[30] Foreign Application Priority Data

Nov. 20, 1990 [JP] Japan .................. 2-312639

[51] Int. Cl.$^5$ .............. H04N 1/46; G03F 3/08
[52] U.S. Cl. .................. 358/515; 358/428; 358/501; 358/518
[58] Field of Search .......... 358/80, 428, 75, 501, 358/515, 518, 519, 520, 521

[56] References Cited

U.S. PATENT DOCUMENTS

| | | | |
|---|---|---|---|
| 4,887,151 | 12/1989 | Wataya | 358/80 |
| 4,905,097 | 2/1990 | Watanabe et al. | 358/456 |
| 4,907,076 | 3/1990 | Ohsawa | 358/80 |
| 4,941,037 | 7/1990 | Sasaki et al. | 358/80 |
| 4,965,664 | 10/1990 | Udagawa et al. | 358/80 |
| 5,060,060 | 10/1991 | Udagawa et al. | 358/80 |
| 5,119,184 | 6/1992 | Hiratsuka et al. | 358/80 |

FOREIGN PATENT DOCUMENTS

| | | | |
|---|---|---|---|
| 273398 | 7/1988 | European Pat. Off. | H04N 1/46 |
| 342060 | 11/1989 | European Pat. Off. | G03G 21/00 |
| 2053619 | 2/1981 | United Kingdom | H04N 1/46 |
| 2050751 | 7/1981 | United Kingdom | H04N 1/40 |

OTHER PUBLICATIONS

Kanamori et al., "A Novel Color Transformation Algorithm and Its Applications", SPIE, vol. 1244, Image Processing Algorithms and Techniques, pp. 272-281 (1990).

*Primary Examiner*—Edward L. Coles, Sr.
*Assistant Examiner*—Kimberly A. Williams
*Attorney, Agent, or Firm*—Fitzpatrick, Cella, Harper & Scinto

[57] ABSTRACT

Interpolation processing is applied to the output of a look-up table in which a correlation between color-separation signals and density signals ideal for these color-separation signals are stored, with a quantization error produced when quantizing the color-separation signals being adopted as an interpolation coefficient. The quantization and the interpolation processing are executed in a uniform color space.

10 Claims, 5 Drawing Sheets

COLOR IMAGE PROCESSING APPARATUS

BACKGROUND OF THE INVENTION

This invention relates to a color image processing apparatus and, more particularly, to a color image processing apparatus characterized by its color reproduction processing.

A method of color reproduction processing by a conventional digital color image copying apparatus using electrostatic photography or ink-jet printing includes color processing in which a color image output signal is obtained by referring to a table memory storing corresponding relationships for converting quantized color image signals of the colors red (R), green (G) and blue (B) into output printing signals of the colors cyan (C), magenta (M) and yellow (Y), respectively.

However, mn the conventional method of reproducing colors mentioned above, the following problems arise:

(1) The method requires the provision of the aforementioned table memory, which is the equivalent of color processing for applying a masking operation to RGB density signals Dr, Dg, Db consisting of eight bits per color, and obtaining Y, M, C, K output signals also consisting of eight bits per color. As a consequence, a large memory capacity is required and cost is high.

(2) Quantizing the memory input signal and reducing memory capacity means reducing the tone quality of the read image signal. As a result, the tone quality of the output image is eliminated and a false contour is produced, thereby greatly detracting from picture quality.

(3) Reducing memory capacity while maintaining tone quality in an effort to solve the foregoing problems involves narrowing the reproduction range of the read image signal. This results in greatly diminished picture quality, such as deterioration of the output image at portions where saturation is high.

SUMMARY OF THE INVENTION

An object of the present invention is to provide a color image processing apparatus which solves the aforementioned problems. More particularly, an object of of the present invention is to improve a degree of color reproduction with a simple construction.

Another object of the present invention is to reduce the memory capacity which is required for conversion of color component signals by using a look-up table.

Still another object of the present invention is to perform an accurate interpolation in case of conversion of color component signals by using a look-up table.

Another object of the present invention is to make a conversion of color components easily.

According to the present invention, a color image processing apparatus which comprises input means for inputting color component signals, quantization means for quantizing the input color component signals and outputting quantized color component signals, a look-up table for storing a correlation between said quantized color component signals and density signals suitable for respective ones of the quantized color component signals, interpolation means for interpolating the density signals output from said look-up table in accordance with the levels of the density signals The foregoing object is attained by providing a color image processing apparatus which comprises an image input unit for inputting color-image information, a look-up table for storing a correlation between color-separation signals, which are obtained by separating the color-image information into individual color components, and density signals optimum for respective ones of the color-separation signals, an image processing unit for converting the color-separation signals into corresponding density signals by referring to the look-up table, and an image output unit for permanently visibly displaying a color image on a multicolor recording medium in conformity with the density signals from the image processing unit, wherein the image processing unit quantizes the color-separation signals and inputs the quantized signals to the look-up table, and executes interpolation processing with regard to an output from the look-up table.

In a preferred embodiment, the image processing unit computes a quantization error which arises when the color-separation signals are quantized, and executes the interpolation processing with regard to an output from the look-up table by using the quantization error as an interpolation coefficient.

In a preferred embodiment, the image processing unit executes the quantization of the color-separation signals as well as the interpolation processing in a uniform color space.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Embodiments of the present invention will now be described with reference to the drawings.

First Embodiment

Figure 1:
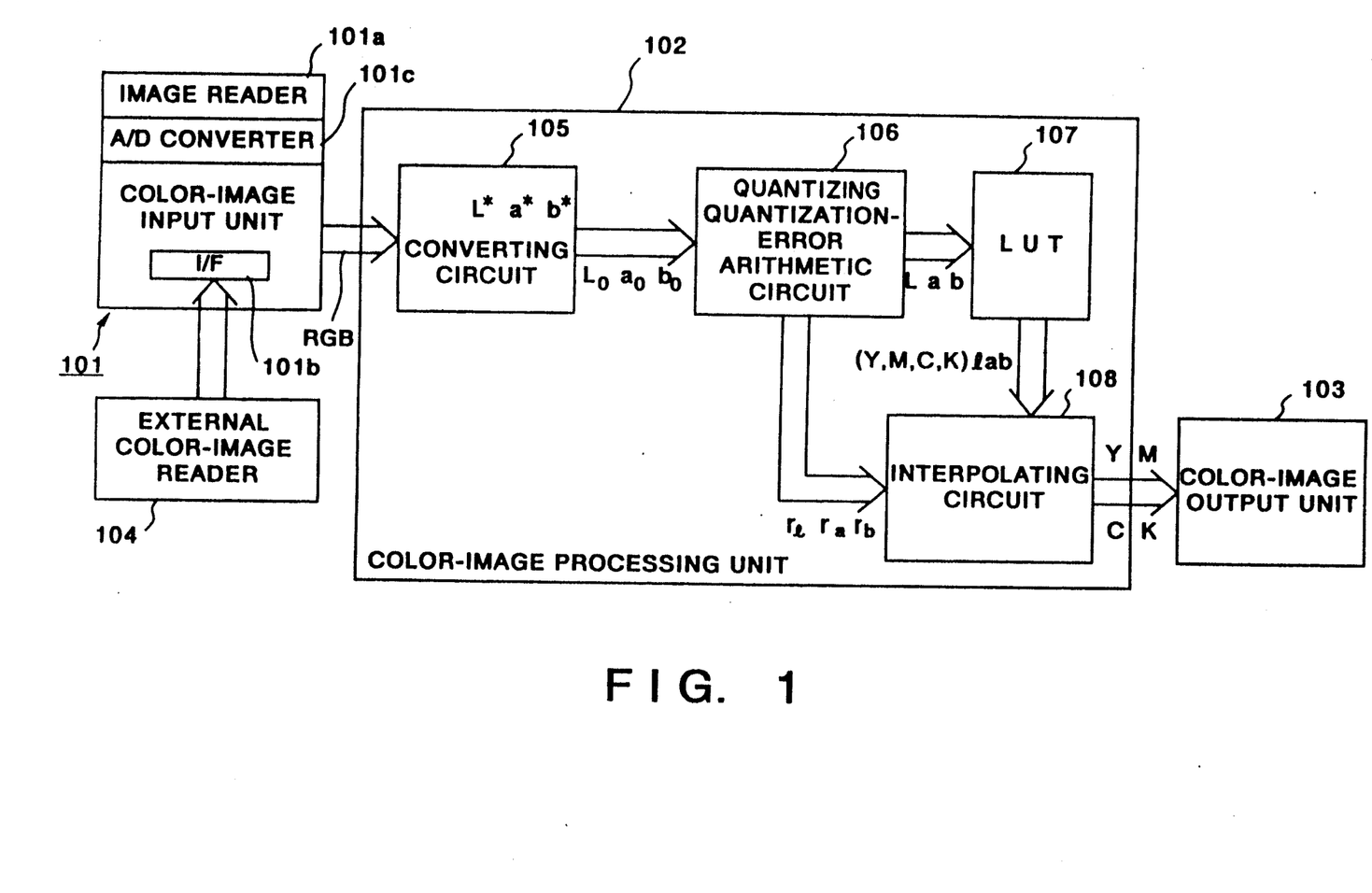
FIG. 1 is a block diagram illustrating the construction of a color image apparatus according to an embodiment of the present invention.

FIG. 1 is a block diagram illustrating the construction of a color image apparatus according to an embodiment of the present invention.

In FIG. 1, color-separation signals indicative of the three colors red (R), green (G) and blue (B) enter an A/D converter 101c built in a color-image input unit 101. The R, G and B color-separation signals are read in by an image reader 101a of the color-image input unit 101, or are read in by an external color-image reader 104, such as an electronic still-video camera, a host computer for creating computer graphics, or a video camera, and input via an interface 101b built in the color-image input unit 101. The A/D converter 101c proceeds to convert the inputted color-separation signals into digital signals each of which is composed of a prescribed number of bits.

There is no limitation with regard to reference color stimuli of the color-separation signals for the three colors R, G, B converted into digital signals. However, in consideration of such points as the standardization of color-separation signals by an external image input unit, it is preferred that a signal format be adopted in line with the NTSC standard in which reference color stimuli of the respective color-separation signals R, G, B are stipulated as follows in terms of x-y coordinates in a CIE, XYZ colorimetric system:

$$x_R = 0.67, \quad y_R = 0.33 \quad (1)$$
$$x_G = 0.21, \quad y_G = 0.71$$
$$x_B = 0.14, \quad y_B = 0.08$$

The R, G, B color separation signals thus read and converted into digital quantities by the image input unit 101 are output to a color-image processing unit 102.

The R, G, B color-separation signals input to the color-image processing unit 102 are converted into CIE uniform color-space coordinates (L*, a*, b*) by an L*a*b* converting circuit 105.

In a case where the R, G, B color-separation signals are in line with the aforementioned NTSC standard, R, G, B and L*, a*, b* can be converted in accordance with the following relations:

$$L^* = 116(Y/Y_0)^{\frac{1}{3}} - 16 \quad (2)$$
$$a^* = 500[(X/X_0)^{\frac{1}{3}} - (Y/Y_0)^{\frac{1}{3}}]$$
$$b^* = 200[(Y/Y_0)^{\frac{1}{3}} - (Z/Z_0)^{\frac{1}{3}}]$$

where $X_0, Y_0, Z_0$ are constants, and X, Y, Z represent the XYZ coordinates of the above-mentioned colorimetric system and are related as follows:

$$\begin{aligned} X &= 0.6067R + 0.1736G + 0.2000B \\ Y &= 0.2988R + 0.5868G + 0.1144B \\ Z &= \phantom{0.0000R +\ } 0.0661G + 1.1150B \end{aligned} \quad (3)$$

The L*a*b* signals produced by the L*a*b* converting circuit 105 enter a quantizing/quantization-error arithmetic circuit 106 which performs quantization for converting the signals into address data of a look-up table 107, described below, and computes a quantization error produced when this quantization is carried out.

Before the specifics of the quantizing/quantization error arithmetic circuit 106 are described, the look-up table 107 will be explained in detail.

The look-up table 107 is a memory constituted by ROM, RAM or the like. Input signals thereto serve as an addresses corresponding to the CIE uniform color-space coordinates (L*, a*, b*), and the output signals thereof are four signals for the colors yellow (Y), magenta (M), cyan (C) and black (K) corresponding to ink- or toner-print signals.

Figure 2:
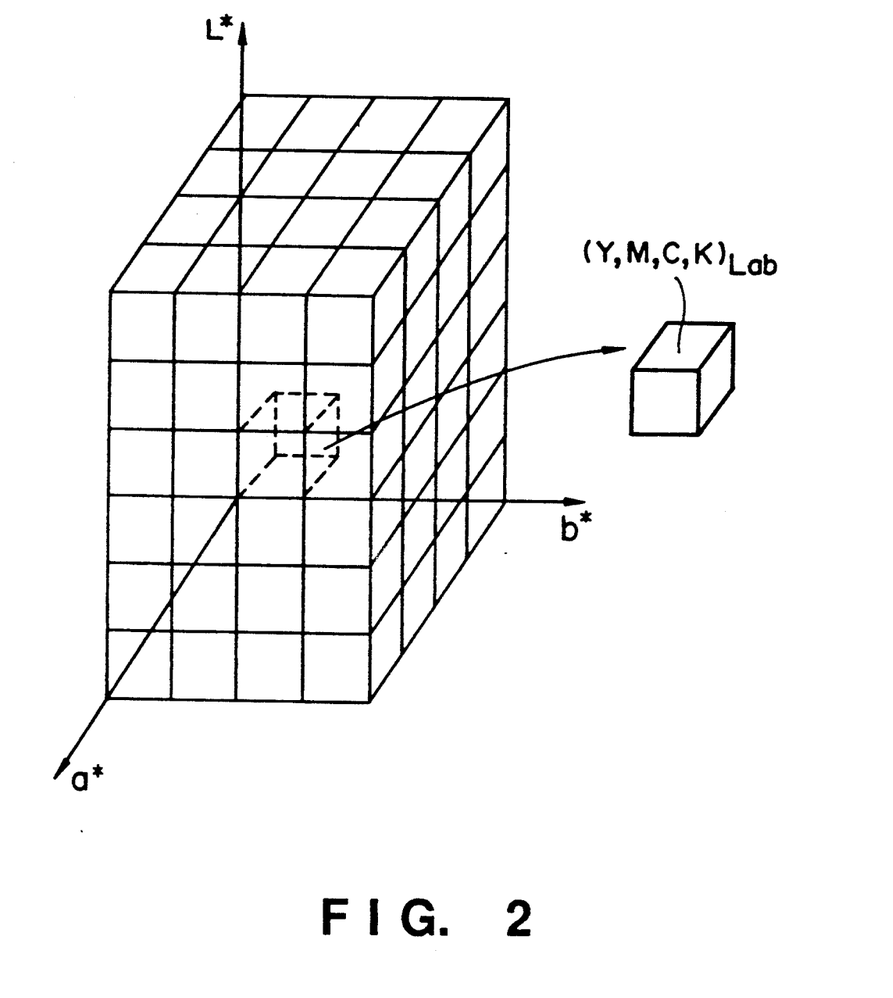
FIG. 2 is a conceptual view illustrating the relationship among input signals in a look-up table in this embodiment.

FIG. 2 is a diagram showing the input/output concept of the look-up table 107.

Addresses of the look-up table 107 represent the color coordinates of a color space expressed by the color coordinates L*a*b*. These coordinates correspond to values on the coordinate axes of a lattice shown in FIG. 2. In addition, the addresses of the look-up table 107 take on discrete coordinate values obtained by block-quantizing the interior of the L*a*b* color space.

When certain color coordinates L*a*b* have been decided, the signal values of Y, M, C, K to be printed by the color-image output unit 103 are stored beforehand in the look-up table 107, as indicated by the small block in FIG. 2. Then, when these Y, M, C, K signals are subsequently printed by the color-image output unit 103, the values of these signals are determined by a correlation decided in such a manner that colors equivalent to those of the table input signals L*a*b* are obtained.

It should be noted that a correlation between input data and output data of the look-up table 107 may be independent of an approximation equation.

The memory capacity of the look-up table 107 depends upon the size of the block representing the color-reproduction range and the size of the small block representing the color-reproduction step.

Figure 3A:
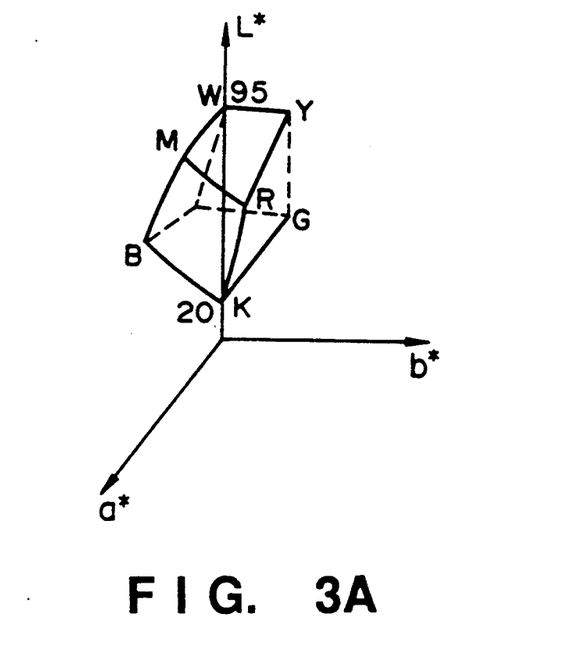
FIGS. 3A and 3B are diagrams showing a color-coordinate distribution of input signals in this embodiment.
Figure 3B:
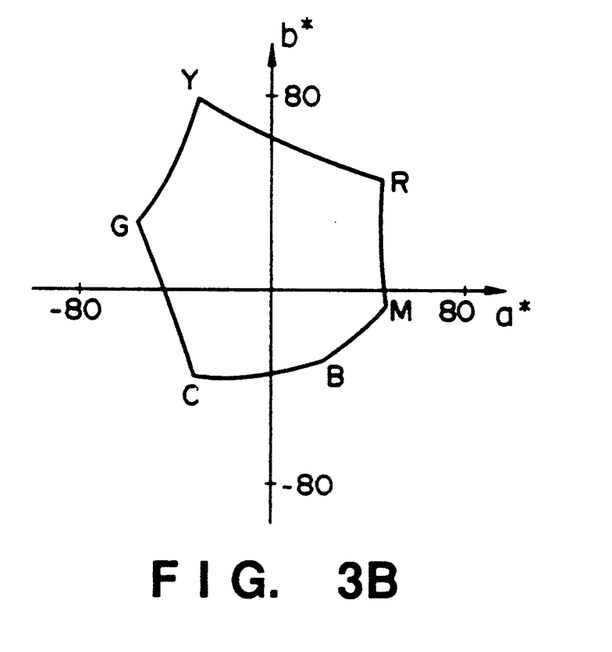

FIG. 3A is a diagram in which the read color range of the color-image input unit 101 is represented in L*a*b* space. FIG. 3B is a diagram showing an example of a positive image on the a*-b* plane of this color range.

In FIGS. 3A and 3B, the color distribution in the L* direction is about 20 (dark) through 95 (bright) and −80 through 80 in the a* and b* directions. In order to reproduce color-image signals representing such a color distribution, it is necessary for the size of the block shown in FIG. 2 to be made 20 through 95 in the L* direction and −80 through 80 in the a* and b* directions.

When a table is created of input data, in which each axis of this color space is quantized into m-bit data, and output data of n bits for each of the colors Y, M, C and K, the capacity of the memory is as follows:

$$2^{3m-n+6} \text{ (bytes)} \quad (4)$$

The quantizing/quantization-error arithmetic circuit 106 quantizes $L^*a^*b^* = (L_0 a_0 b_0)$, obtained by the converting operation of the L*a*b* converting circuit 105, and converts these into m-bit signals serving as input signals to the look-up table 107.

The L*a*b* conversion signals $L_0 a_0 b_0$, the input signals to the look-up table 107, and the quantization error will be described with reference to FIG. 4. To simplify the description, the foregoing will be discussed in terms of one-dimensional coordinates along the a* axis from among the L*a*b* axes.

Figures 4, 5:
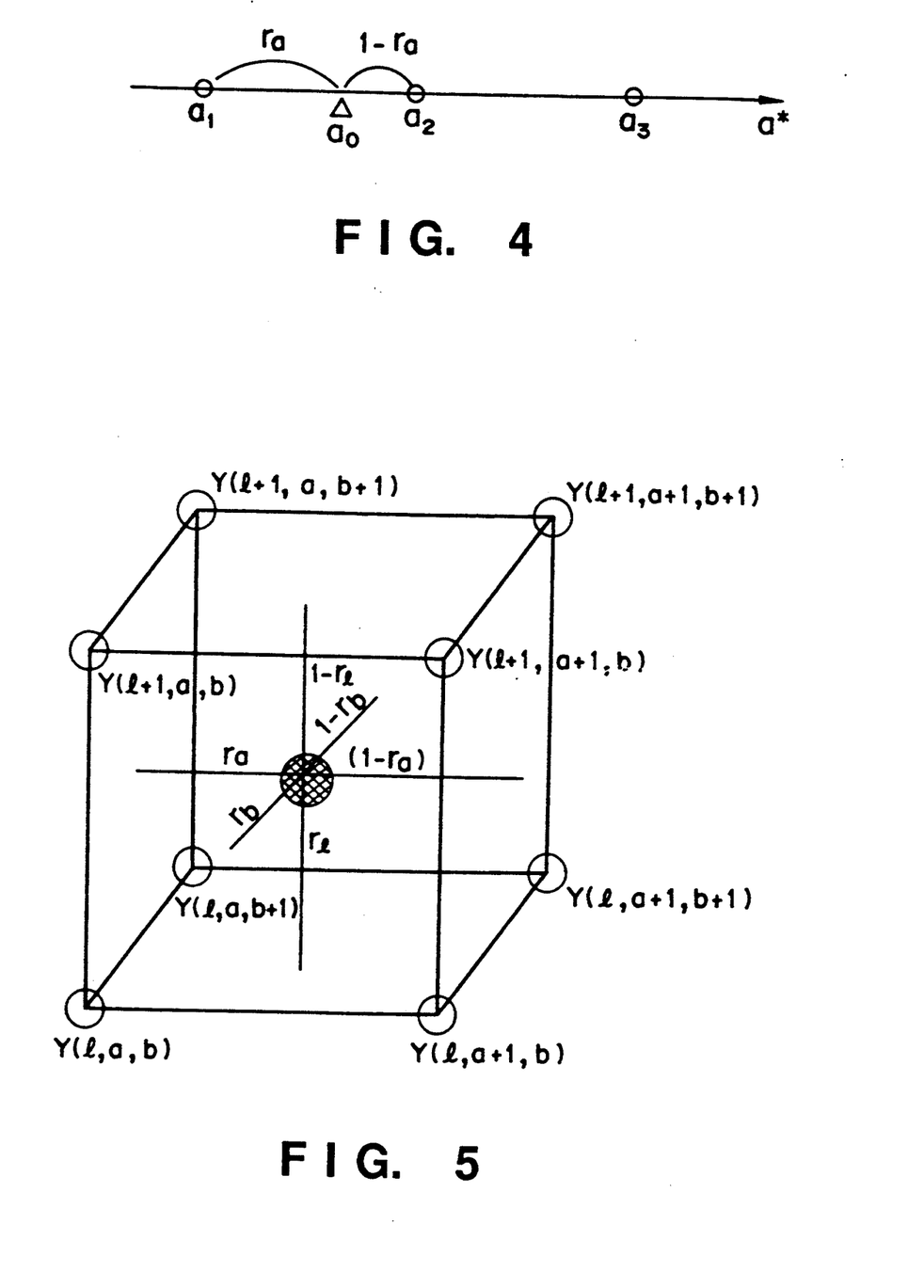
FIG. 4 is a diagram illustrating the relationship between read image signals and quantized data in this embodiment.
FIG. 5 is a diagram showing interpolated data and interpolation ratio for performing interpolation from referential data in the look-up table of this embodiment.

The horizontal axis in FIG. 4 represents the a* axis among the input coordinate axes of the look-up table 107 shown in FIG. 2. The lattice points in Fig. 4, namely the a* coordinates corresponding to the addresses of the look-up table 107, are represented by $a_1, a_2, a_3, \ldots$.

As set forth above, addresses of the look-up table are quantized so as to enter the color distribution of an input signal in the form of a prescribed number of bits (m bits in this embodiment). Consequently, $a_1, a_2, a_3, \ldots$ possess discrete, discontinuous values. More specifically, if, for example, the look-up table adopted is one in which the color distribution $-80 \leq a^* \leq 80$ for the a* axis is expressed by m=5 bits, namely 32 tones, then the addresses will possess the lattice points $a_1, a_2, a_3, \ldots$ for every color difference $(160/32)=(5)$.

As shown in FIG. 4, "$a_0$" of the L*a*b* conversion signals in most cases does not coincide with one of the lattice points but resides between lattice points. Accordingly, "$a_0$" is converted into a point on the lattice by quantization such as a bit shift. As expressed in FIG. 4, "$a_0$" becomes the input signal "$a_1$" to the look-up table 107 by virtue of quantization.

On the other hand, a quantization error $\delta$ produced by this quantization is as follows:

$$\delta = a_0 - a_1 \quad (5)$$

In the quantization error calculation, an internal ratio $\gamma$ is calculated as follows, where $\gamma$ is the internal ratio at which this "$a_0$" is formed by lattice points $a_1$, $a_2$ on either side of "$a_0$":

$$\gamma = \frac{a_0 - a_1}{a_2 - a_0} \quad (6)$$

The foregoing processing is executed entirely in uniform color space. In other words, in the computation of the internal ratio in uniform color space, the amount of the error ascribable to the quantization error has a correlation with a sense of shift in the human sense of color, and therefore interpolation, described below, at this internal ratio corresponds to a sensory correction.

The internal ratio $\gamma$ thus calculated is calculated in the same fashion for the b* and L* axes. The quantizing/quantization-error arithmetic circuit 106 calculates quantized data ($L_1$, $a_1$, $b_1$) of the image signals ($L_0$, $a_0$, $b_0$) as well as internal ratios ($\gamma 1$, $\gamma a$, $\gamma b$) of the quantization errors The items of quantized data ($L_1$, $a_1$, $b_1$) are entered as the input signals of the look-up table 107, as described earlier. As a result, (Y, M, C, K)$_{lab}$ are outputted from the look-up table 107. Further, the look-up table 107 also simultaneously outputs one higher order address, namely address $a_2$ shown in FIG. 4, as a signal with regard to each of the L*, a* and b* axes. FIG. 5 is a diagram in which this is seen with regard to the yellow (Y) signal.

In FIG. 5, $Y_{(l,a,b)}$ represents an output value based upon the quantized data ($L_1$, $a_1$, $b_1$, and $Y_{(l+1,a,b)}$ represents an output value at an immediately adjacent address ($L_2$, $a_1$, $b_1$) on the L* axis among the quantized data Lab. Thus, eight items of data at the lattice points shown in FIG. 5 are output to an interpolating circuit 108.

The image data ($L_0$, $a_0$, $b_0$) prior to quantization internally divides the cube shown in FIG. 5 at the internal ratios $\gamma_1$: $(1-\gamma_1)$, $\gamma_a$: $(1-\gamma_a)$, $\gamma_b$: $(1-\gamma_b)$ along the L*a*b* axes, and therefore the internal dividing points are expressed as follows using the lattice points of the cube:

$$\begin{aligned}
Y = &\ (1 - \gamma_1)(1 - \gamma_a)(1 - \gamma_b)Y_{(1,a,b)} + \\
&\ \gamma_1(1 - \gamma_a)(1 - \gamma_b)Y_{(1+1,a,b)} + \\
&\ (1 - \gamma_1)\gamma_a(1 - \gamma_b)Y_{(1,a+1,b)} + \\
&\ (1 - \gamma_1)(1 - \gamma_a)\gamma_b Y_{(1,a,b+1)} + \\
&\ \gamma_1\gamma_a(1 - \gamma_b)Y_{(1+1,a+1,b)} + \\
&\ \gamma_1(1 - \gamma_a)\gamma_b Y_{(1+1,a,b+1)} + \\
&\ (1 - \gamma_1)\gamma_a\gamma_b Y_{(1,a+1,b+1)} + \\
&\ \gamma_1\gamma_a\gamma_b Y_{(1+1,a+1,b+1)}
\end{aligned} \quad (7)$$

Interpolated data are obtained in similar fashion for each of the colors M, C and K.

The Y, M, C and K signals thus interpolated are outputted from the color image processing unit 102, and these are rendered into print signals in an electrostatic photographic or ink-jet system and recorded by being printed out by the image output unit 103. An output image is thus obtained.

In the first embodiment described above, an example is described in which uniform color space is a CIE L*a*b* coordinate system. However, the present invention is not limited to the foregoing example. For instance, by putting Eq. (2) into the form of the following transformation equations, the same effects can be obtained even in a CIE LUV coordinate system:

$$\begin{aligned}
L^* &= 116(Y/Y_0)^{\frac{1}{3}} - 16 \\
U^* &= 13L^*(u - u_0) \\
V^* &= 13L^*(v - v_0)
\end{aligned} \quad (8)$$

$V^* = 13L^*(v-v_0)$ where $$\begin{aligned}
u &= 4X/(X + 15Y + 3Z) \\
v &= 9Y/(X + 15Y + 3Z)
\end{aligned} \quad (9)$$

Second Embodiment

In the first embodiment described above, the input signals to the look-up table 107, the interpolation coefficients and the look-up table 107 use a rectangular coordinate system in which the orthogonal axes L*, a*, b* of an L*a*b* coordinate system are adopted as the coordinate axes. However, the present invention is not limited to this example. By using a cylindrical coordinate system expressed by absolute values $\gamma$, L* and an argument $\theta$, the memory space occupied by the look-up table 107 is placed in a cylindrical system. By eliminating areas in which data does not exist in the rectangular coordinate system, the required memory capacity can be reduced even further.

More specifically, as shown in the conceptual diagram regarding the look-up table 107 of FIG. 2, the look-up table becomes a rectangular parallelepiped comprising a collection of small blocks possessing equal volume in color space.

Figure 6A:
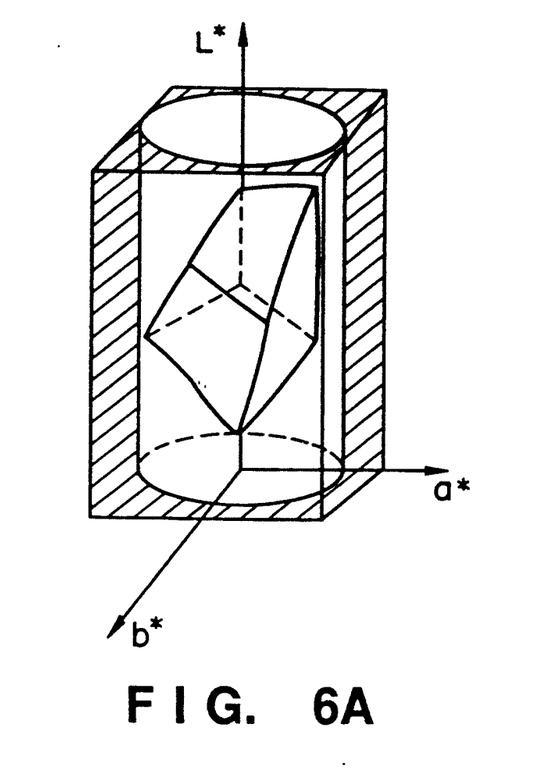
FIGS. 6A and 6B are diagrams showing FIGS. 3A and 3B along with the memory space of a look up table in a second embodiment of the present invention.
Figure 6B:
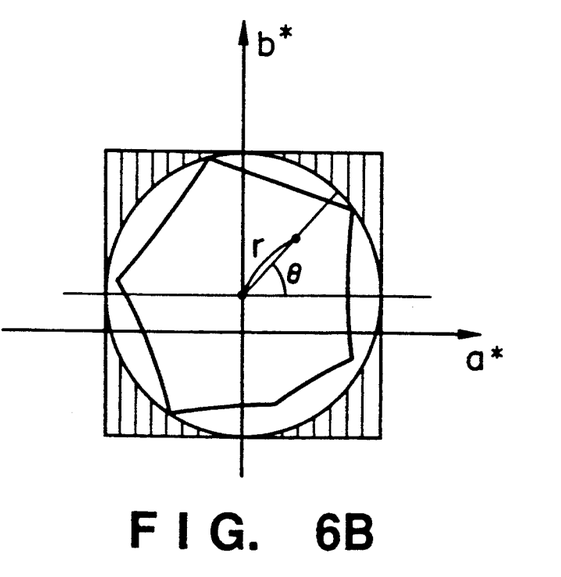

FIGS. 6A and 6B are diagrams showing the read color range of the color-image input unit 101 of FIGS. 3A and 3B along with the memory space of the look-up table 107.

As illustrated in FIGS. 6A and 6B, a natural color distribution generally is distributed in concentric circles with achromatic color serving as the central axis in the a*-b* plane. That is, the shaded portions in FIGS. 6A and 6B are areas in which corresponding colors do not actually exist, i.e., areas in which data is not present in the look-up table 107 comprising a rectangular parallelepiped. Therefore, in this embodiment, the memory space occupied by the look-up table 107 is placed in the form of a cylinder by using a cylindrical coordinate system expressed by absolute values $\gamma$, L* and an argument $\theta$. By eliminating areas in which data does not exist in the rectangular coordinate system, the required memory capacity can be greatly reduced.

In accordance with the present invention, as described above, interpolation processing is applied to the output of a look up table based upon a quantization error produced when quantization is carried out. As a result, the memory capacity of the look up table can be reduced and the cost of the apparatus can be lowered. In addition, color reproduction without loss of data can be realized, thus making it possible to maintain a high picture quality for the output image.

Furthermore, in accordance with the present invention, an interpolation is performed by using levels of the density signals with regard to an output from a look-up table and quantizing error. Thus the interpolation becomes accurate and a degree of color reproduction for reproduced images can be increased.

As many apparently widely different embodiments of the present invention can be made without departing from the spirit and scope thereof, it is to be understood that the invention is not limited to the specific embodiments thereof except as defined in the appended claims.

What is claimed is:

1. A color image processing apparatus which comprises:
    input means for inputting color component signals which include a luminance component and a chrominance component;
    quantization means for quantizing the input color component signals and outputting quantitized color component signals;
    a look-up table for storing a correlation between the quantized color component signals and density signals suitable for respective ones of the quantitized color component signals;
    interpolation means for interpolating the density signals output from said look-up table in accordance with the levels of the density signals,
    wherein said interpolation means computes a quantization error which arises when input color component signals are quantized by said quantization means, and executes the interpolation processing with regard to an output from said look-up table by using the quantization error as an interpolation coefficient.

2. The apparatus according to claim 1, wherein said interpolation means performs an interpolation by using a quantization error computed by said quantization means and levels of the density signals with regard to an output from said look-up table.

3. The apparatus according to claim 1, wherein a correlation between inputs and outputs of said look-up table cannot be expressed by an approximation equation.

4. The apparatus according to claim 1, wherein said look-up table comprises a read only memory or a random access memory.

5. A color image processing apparatus which comprises:
    image input means for inputting color-image information;
    a look-up table for storing a correlation between color-separation signals, which are obtained by separating the color-image information into individual color components, and density signals suitable for respective ones of the color-separation signals;
    image processing means for converting the color-separation signals into corresponding density signals by referring to said look-up table; and
    image output means for displaying a color image on a recording medium in conformity with the density signals from said image processing means,
    wherein said image processing means quantizes the color-separation signals and inputs the quantized signals to said look-up table, and said image processing means executes interpolation processing with regard to an output from said look-up table in accordance with the levels of the density signals output from said look-up table, and
    wherein said image processing means computes a quantization error which arises when the color-separation signals are quantized, and executes the interpolation processing with regard to an output from said look-up table by using the quantization error as an interpolation coefficient.

6. The apparatus according to claim 5, wherein said image processing means executes the quantization of the color-separation signals in a uniform color space.

7. The apparatus according to claim 6, wherein said image processing means obtains lattice points by equally dividing, at predetermined tones, a color-distribution of the color-separation signals in the uniform color space, and adopting, as the interpolation co-efficient, an internal dividing ration of the quantization error within a cube of a minimum unit formed at said lattice points.

8. The apparatus according to claim 7, wherein said image processing means executes interpolation processing based upon interpolation data decided by the product of a signal value for each color corresponding to lattice points of the cube and the interpolation coefficient.

9. The apparatus according to claim 6, wherein said uniform color space is a rectangular coordinate system in which mutually orthogonal axes are adopted as the coordinate axes.

10. The apparatus according to claim 6, wherein said uniform color space is a cylindrical coordinate system in which a cylindrical coordinate axis is adopted as the central axis.

* * * * *

UNITED STATES PATENT AND TRADEMARK OFFICE
CERTIFICATE OF CORRECTION

PATENT NO. : 5,315,415
DATED : May 24, 1994
INVENTOR(S) : TAKASHI KAWAI, ET AL.

It is certified that error appears in the above-identified patent and that said Letters Patent is hereby corrected as shown below:

COLUMN 1

Line 18, "mn" should read --in--.
   Line 44, "of of" should read --of--.

COLUMN 2

Line 44, "embodiment;" should read --embodiment; and--.
   Line 46, "look up" should read --look-up--.

COLUMN 3

Line 20, "color separation" should read --color-separation--.
   Line 50, "quantizing/quantization" should read
           --quantizing/quantization- --.
   Line 55, "an" should be deleted.

COLOMN 4

Line 67, ""$a_0$"" should read --"$a_0$"--.

COLUMN 5

Line 1, ""$a_0$"" should read --"$a_0$"--.
   Line 5, "$\delta - a_0 - a_1$                (5)" should read
           --$\delta = a_0 - a_1$                (5)--.
   Line 31, "outputted" should read --output--.
   Line 39, "($L_1 a_1 b_1$," should read --($L_1 a_1 b_1$),--.
   Line 62, "j" should be deleted.
   Line 67, "outputted" should read --output--.

UNITED STATES PATENT AND TRADEMARK OFFICE
CERTIFICATE OF CORRECTION

PATENT NO. : 5,315,415
DATED : May 24, 1994
INVENTOR(S) : TAKASHI KAWAI, ET AL.

It is certified that error appears in the above-identified patent and that said Letters Patent is hereby corrected as shown below:

COLUMN 6

Line 16, "$V^*=13L^*(V-V_0)$" should be deleted.
Line 62, "look up" should read --look-up--.
Line 64, "look up" should read --look-up--.

COLUMN 7

Line 19, "quantitized" should read --quantized--.
Line 23, "quanit-" should read --quantized--.
Line 24, "ized" should be deleted.

COLUMN 8

Line 33, "co-efficient," should read --coefficient,--.
Line 34, "ration" should read --ratio--.

Signed and Sealed this

Eighth Day of August, 1995

Attest:

BRUCE LEHMAN

*Attesting Officer*     *Commissioner of Patents and Trademarks*